United States Patent
Wang et al.

(10) Patent No.: US 12,438,369 B2
(45) Date of Patent: Oct. 7, 2025

(54) GENERATOR ACCESS SYSTEM FOR HOUSEHOLD ENERGY STORAGE

(71) Applicant: FranklinWH Energy Storage Inc., San Jose, CA (US)

(72) Inventors: Tao Wang, Shenzhen (CN); Gang Xiao, Shenzhen (CN); Daqing Wang, Shenzhen (CN); Song Chen, Shenzhen (CN)

(73) Assignee: FranklinWH Energy Storage Inc., San Jose, CA (US)

( * ) Notice: Subject to any disclaimer, the term of this patent is extended or adjusted under 35 U.S.C. 154(b) by 5 days.

(21) Appl. No.: 18/355,727

(22) Filed: Jul. 20, 2023

(65) Prior Publication Data

US 2024/0039280 A1 Feb. 1, 2024

Related U.S. Application Data

(63) Continuation of application No. PCT/CN2023/085463, filed on Mar. 31, 2023.

(30) Foreign Application Priority Data

Jul. 26, 2022 (CN) .......................... 202221978781.8

(51) Int. Cl.
*H02J 3/00* (2006.01)

(52) U.S. Cl.
CPC ........... *H02J 3/007* (2020.01); *H02J 2300/24* (2020.01)

(58) Field of Classification Search
CPC ...................................... H02J 3/007
USPC .......................................... 307/38
See application file for complete search history.

(56) References Cited

U.S. PATENT DOCUMENTS

| | | | |
|---|---|---|---|
| 11,183,843 B1* | 11/2021 | Cooper | H02J 3/322 |
| 2022/0294222 A1* | 9/2022 | Winter | H02J 3/144 |
| 2022/0399722 A1* | 12/2022 | Dennis | H02J 3/381 |
| 2023/0170726 A1* | 6/2023 | Harris | B60R 16/033 |

* cited by examiner

*Primary Examiner* — Joseph Chang
(74) *Attorney, Agent, or Firm* — ANOVA LAW GROUP, PLLC

(57) ABSTRACT

Provided is a generator access system for household energy storage. The generator access system for household energy storage includes an automatic transfer switch (ATS), an energy gateway, an energy storage system, and a load access switching module. The energy gateway is connected to the automatic transfer switch (ATS) and the automatic transfer switch (ATS) is further connected to a generator. The automatic transfer switch (ATS) is configured to control coupling of the energy gateway and the generator and decoupling of the generator from the energy gateway; the energy storage system is connected to the energy gateway and includes at least one energy storage module configured to store electrical energy. The load access switching module is connected to the energy gateway and configured to control a number of connected loads.

10 Claims, 4 Drawing Sheets

GENERATOR ACCESS SYSTEM FOR HOUSEHOLD ENERGY STORAGE

CROSS-REFERENCE TO RELATED APPLICATION(S)

This application is a continuation application of International Patent Application No. PCT/CN2023/085463, filed on Mar. 31, 2023, which claims priority to Chinese Patent Application No. 202221978781.8, filed on Jul. 26, 2022, the disclosure of all of which are incorporated herein by reference in their entireties.

TECHNICAL FIELD

The present application relates to the technical field of household energy storage and, in particular, relates to a generator access system for household energy storage.

BACKGROUND

When a household energy storage system is connected to a generator, the generator often works in two manners described below. 1. An energy storage monitoring module of the energy storage system is directly connected to the generator to monitor the generator. However, since different models of generators from different manufacturers need to be paired and programmed one by one, the energy storage monitoring module can support only the models of generators that have been debugged, resulting in low flexibility for the household energy storage system to be connected to the generator. 2. An automatic transfer switch (ATS) is used for controlling the generator. However, the ATS is used for automatically detecting whether a grid blackout occurs, and the ATS switches to a generator mode after the grid blackout. Therefore, at this time, it takes time for the generator to start, resulting in a power outage at home until the generator starts to supply power. Alternatively, an energy storage device first supplies power, and the power outage does not occur at home. However, the generator is uncontrollable, the generator autonomously operates according to the mode of the ATS, and an energy storage controller cannot form a linkage with the generator, reducing flexibility.

Therefore, the household energy storage system has the problem of low flexibility when connected to the generator.

SUMMARY

Embodiments of the present application provide a generator access system for household energy storage to improve the generator access flexibility in a household energy storage system.

The present application provides a generator access system for household energy storage. The generator access system for household energy storage includes an automatic transfer switch (ATS), an energy gateway, an energy storage system, and a load access switching module. The ATS is configured to be connected to a generator and achieve the control decoupling of the ATS from the generator. The energy gateway is connected to the ATS, and the automatic transfer switch (ATS) is a switch configured to control the coupling of the energy gateway and the generator and to control the decoupling of the generator form the energy gateway. The energy storage system is connected to the energy gateway and includes at least one energy storage module configured to store electrical energy. The load access switching module is connected to the energy gateway and configured to control the number of connected loads.

The energy gateway includes a bus and a first switch, where the first switch is coupled to the bus and configured to control the coupling of the energy gateway and a grid and decoupling of the energy gateway from the grid.

The energy gateway further includes a first circuit breaker, where a first terminal of the first circuit breaker is connected to the first switch, and a second terminal of the first circuit breaker is connected to the grid.

The energy gateway further includes a second switch, where the second switch is coupled to the bus and configured to control the coupling of the energy gateway and the generator and the decoupling of the generator from the energy gateway.

The energy gateway further includes a second circuit breaker, where a first terminal of the second circuit breaker is connected to the second switch, and a second terminal of the second circuit breaker is connected to an L terminal of the ATS.

The energy gateway further includes a third switch, where the third switch is coupled to the bus and configured to control coupling of the energy gateway and photovoltaics and decoupling of photovoltaics from the energy gateway.

The energy gateway further includes a third circuit breaker, where a first terminal of the third circuit breaker is connected to the third switch, and a second terminal of the third circuit breaker is connected to the photovoltaics.

The energy gateway further includes a fourth switch and a fifth switch, where a first terminal of the fourth switch and a first terminal of the fifth switch are coupled to the bus, and a second terminal of the fourth switch and a second terminal of the fifth switch are coupled to a G terminal of the ATS.

The energy gateway further includes a fourth circuit breaker, where a first terminal of the fourth circuit breaker is coupled to the bus, and a second terminal of the fourth circuit breaker is coupled to the energy storage system.

The load access switching module is coupled to the bus or coupled to the grid.

BRIEF DESCRIPTION OF DRAWINGS

Drawings used in the description of embodiments of the present application are briefly described below.

DETAILED DESCRIPTION

The present application is described in conjunction with the drawings and embodiments. It is to be understood that the embodiments described herein are intended to explain and not to limit the present application.

The implementation of the present application is described below in conjunction with the drawings.

Figure 1:
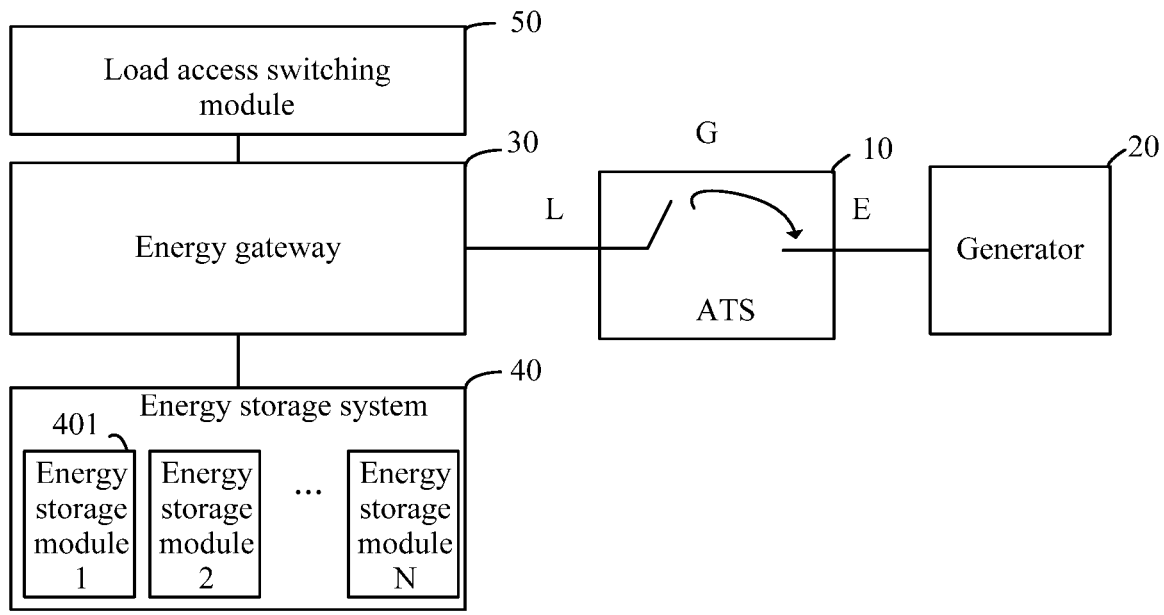
FIG. 1 is a structural diagram of a generator access system for household energy storage in an embodiment of the present application.

Embodiments of the present application provide a generator access system for household energy storage. As shown in FIG. 1, the generator access system for household energy storage includes at least one ATS 10, an energy gateway 30, an energy storage system 40, and at least one load access switching module 50. The at least one ATS 10 is configured to be connected to at least one generator 20 to control coupling of the at least one generator 20 and the energy gateway or decoupling of the at least one generator 20 from the energy gateway, where the at least one ATS 10 has a one-to-one correspondence to the at least one generator 20. The energy gateway 30 is connected to each of the at least one ATS 10, which is a switch configured to control the coupling of the energy gateway 30 and a respective generator 20 or to control the decoupling of the respective generator 20 from the energy gateway 30. The energy storage system 40 is connected to the energy gateway 30 and includes at least one energy storage module 401 configured to store electrical energy. The at least one load access switching module 50 is connected to the energy gateway 30 and configured to control the number of accessed loads 501.

The generator access system for household energy storage provided in the embodiments of the present application is applied to a household energy storage system and includes at least one ATS 10. With the help of each ATS 10, the coupling of the respective generator 20 and the energy gateway or the decoupling of the respective generator 20 from the energy gateway 30 is achieved, that is, before the generator access system for household energy storage is connected to each generator 20, there is no need to pair and debug the household energy storage system and each generator 20. In this manner, the household energy storage system can support all generators, and the coupling of the respective generator 20 and the energy gateway or the decoupling of the respective generator 20 from the energy gateway 30 is achieved at a control terminal of the generator. Optionally, when the generator does not have an ATS (also referred as to ATS module), the above generator access system then provides an ATS for the generator. Alternatively, when the generator has an ATS, the generator may not provide an ATS for the generator.

In the embodiments of the present application, the generator access system for household energy storage includes at least one ATS 10, the energy gateway 30, the energy storage system 40, and the at least one load access switching module 50. The at least one ATS 10 is configured to be connected to the at least one generator 20 and control the coupling of the at least one generator 20 and the energy gateway or the decoupling of the at least one generator 20 from the energy gateway 30. The energy gateway 30 is connected to the at least one ATS 10, which is a switch configured to control the coupling of the energy gateway 30 and the at least one generator 20 and control the decoupling of the at least one generator 20 from the energy gateway 30. The energy storage system 40 is connected to the energy gateway 30 and includes at least one energy storage module 401 configured to store electrical energy. The at least one load access switching module 50 is connected to the energy gateway 30 and configured to control the number of accessed loads 501. In this manner, the generator access flexibility is improved in the household energy storage system.

Figure 2:
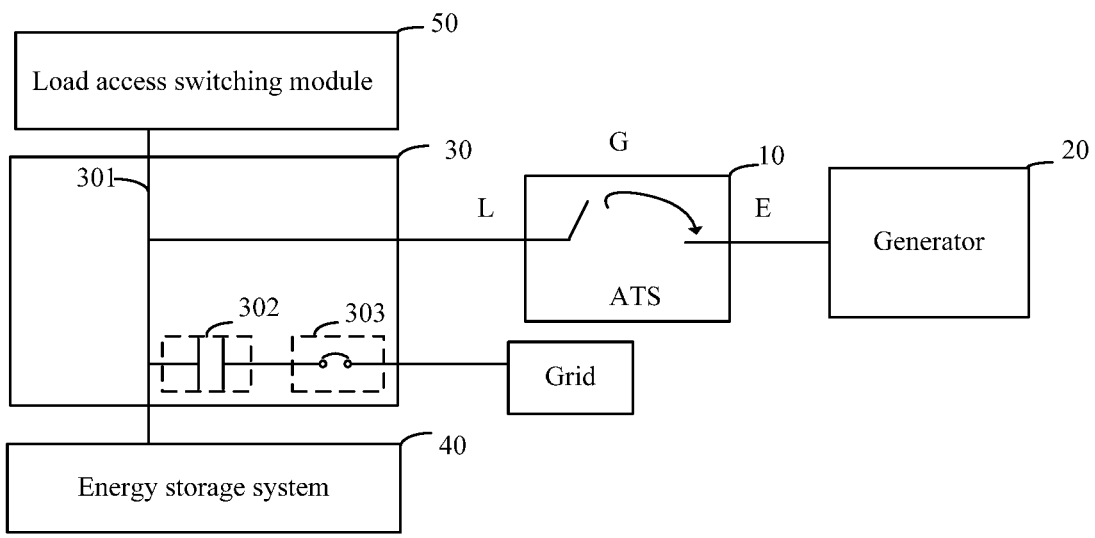
FIG. 2 is a structural diagram of an energy gateway in an embodiment of the present application.

As shown in FIG. 2, the energy gateway 30 includes a bus 301 and a first switch 302, where the first switch 302 is coupled to the bus 301 and configured to control the coupling of the energy gateway 30 and a grid and the decoupling of the grid from the energy gateway 30.

The energy gateway 30 further includes a first circuit breaker 303, where a first terminal of the first circuit breaker 303 is connected to the first switch 302, and a second terminal of the first circuit breaker 303 is connected to the grid. Optionally, the first circuit breaker 303 is normally closed.

When the grid is powered off, the first circuit breaker 303 is turned off (the first switch is in a closed or open state) to cut off the connection between the energy gateway and the grid so that the decoupling of the grid from the energy gateway is achieved, and the household energy storage system (which is also referred to as the household system 40) is used to supply power to the household. When the grid is powered on, the first switch 302 and the first circuit breaker 303 are both turned on to control the coupling of the grid and the energy gateway, and the grid is used to supply power to the household.

In this embodiment, the first switch 302 and the first circuit breaker 303 are provided to control the coupling of the energy gateway and the grid and decoupling of the grid from the energy gateway, and the first switch 302 and the first circuit breaker 303 are used for controlling the coupling of the energy gateway and the grid and the decoupling of the grid from the energy gateway to complete the autonomous control of the grid, thereby simplifying the operation and improving the flexibility of the household energy storage system.

Figure 3:
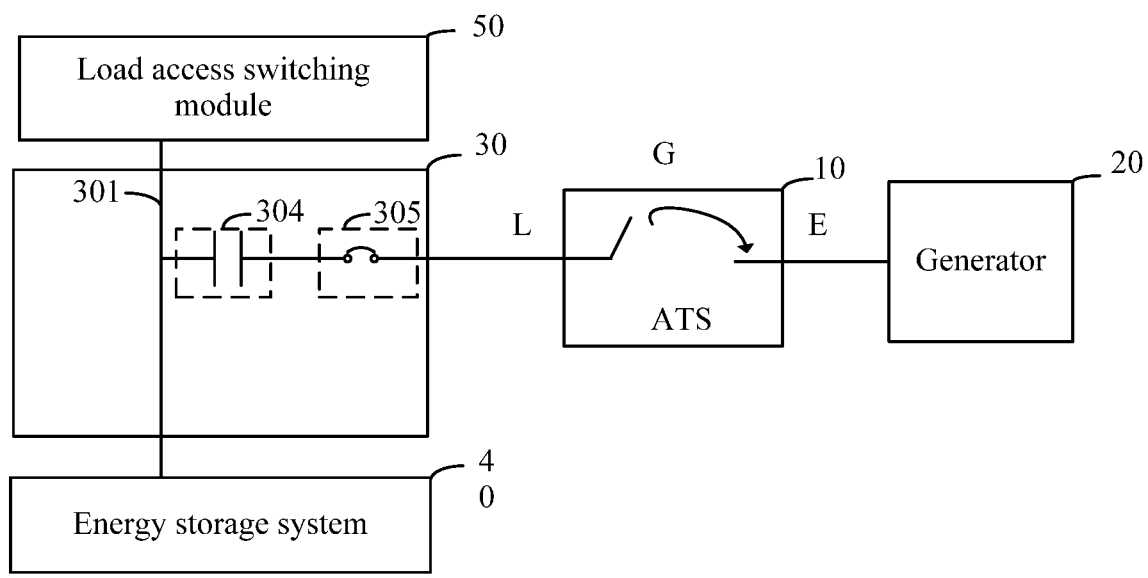
FIG. 3 is another structural diagram of an energy gateway in an embodiment of the present application.

As shown in FIG. 3, the energy gateway 30 further includes a second switch 304, where the second switch 304 is coupled to the bus 301 and configured to control the coupling of the energy gateway 30 and the generator 20 and the decoupling of the generator 20 from the energy gateway 30.

The energy gateway 30 further includes a second circuit breaker 305, where a first terminal of the second circuit breaker 305 is connected to the second switch 304, and a second terminal of the second circuit breaker 305 is connected to an L terminal of the ATS 10.

When the household energy storage system operates normally, the second switch 304 is in an off state, and the household energy storage system collects the voltage across the generator 20. When recognizing that the voltage across the generator 20 exists, the household energy storage system determines that the generator 20 is started, performs a phase-locking process on the generator, and turns on the second switch 304 after the phase-locking process to control the coupling of the generator and the energy gateway (the second circuit breaker 305 is in a normally-closed state), and the generator 20 is used to supply power to the household. When the household is supplied by other devices and no longer requires the generator to power it, the household energy storage system turns off the second switch 304 and is supplied by the other device, the generator is then controlled to stop so that the decoupling of the generator from the energy gateway is achieved.

In this embodiment, the second switch and the second circuit breaker are provided to control the coupling of the energy gateway and the generator and the decoupling of the generator from the energy gateway, and the second switch and the second circuit breaker are used for controlling the coupling of the energy gateway and the generator and the decoupling of the generator from the energy gateway to complete the autonomous control of the generator, thereby simplifying the operation and improving the generator access flexibility in the household energy storage system.

Figure 4:
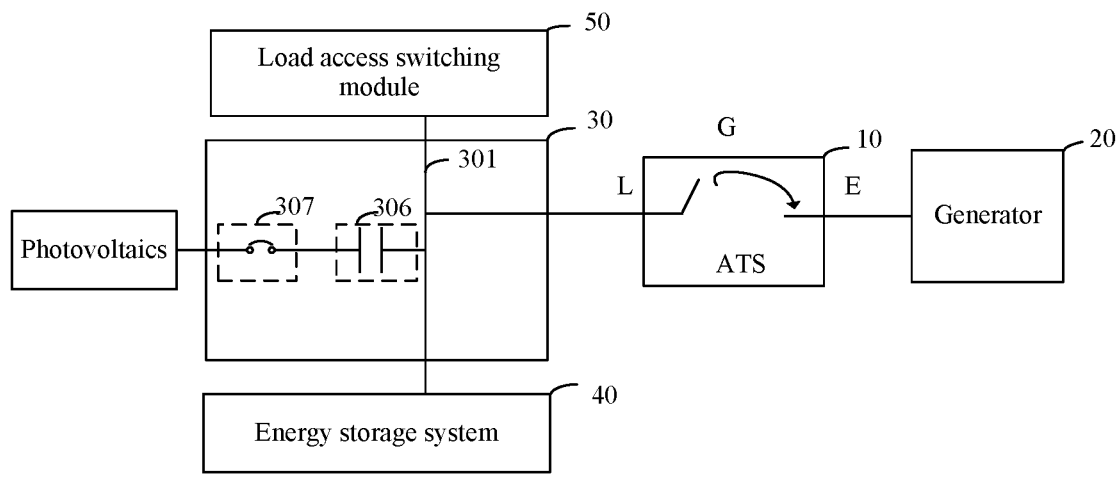
FIG. 4 is another structural diagram of an energy gateway in an embodiment of the present application.

As shown in FIG. 4, the energy gateway 30 further includes a third switch 306, where the third switch 306 is coupled to the bus 301 and configured to control the coupling of the energy gateway and photovoltaics and the decoupling of the photovoltaics from the energy gateway.

The energy gateway 30 further includes a third circuit breaker 307, where a first terminal of the third circuit breaker 307 is connected to the third switch 306, and a second terminal of the third circuit breaker 307 is connected to the photovoltaics.

When the generator is disconnected in the household energy storage system, the photovoltaics may be connected through the third switch 306 to supply power to the load. Optionally, the third circuit breaker 307 is in a normally-closed state and the third switch 306 is controlled to be turned on so that the coupling of the photovoltaics and the energy gateway is achieved. When the third switch 306 is controlled to be turned off, the decoupling of the photovoltaics from the energy gateway is achieved.

In this embodiment, the third switch and the third circuit breaker are provided to control the coupling of the energy gateway and photovoltaics and the decoupling of the photovoltaics from the energy gateway, and the third switch and the third circuit breaker are used for controlling the coupling of the energy gateway and photovoltaics and the decoupling of the photovoltaics from the energy gateway to implement a multi-source load power supply function.

Figure 5:
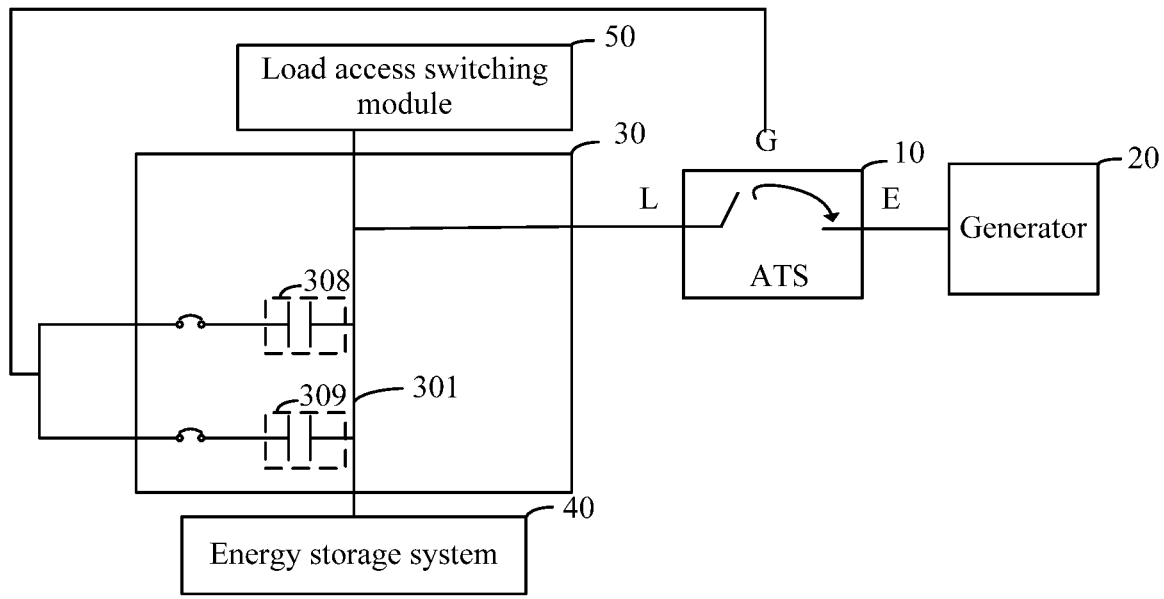
FIG. 5 is another structural diagram of an energy gateway in an embodiment of the present application.

As shown in FIG. 5, the energy gateway 30 further includes a fourth switch 308 and a fifth switch 309, where a first terminal of the fourth switch 308 and a first terminal of the fifth switch 309 are both coupled to the bus, and a second terminal of the fourth switch 308 and a second terminal of the fifth switch 309 are both coupled to a G terminal of the ATS 10.

When power exists on the grid of the household energy storage system and the generator does not need to be started, the fourth switch 308 and the fifth switch 309 are controlled to be turned on so that the G terminal of the ATS 10 senses that power exist and the generator is controlled to stop to achieve the decoupling of the generator from the energy gateway.

The preceding control includes, but is not limited to, controlling the access time of the generator, the start time, the contact mode, the warm-up time, and the cool-down time.

In this embodiment, the household energy storage system can control the generator by controlling the fourth switch and the fifth switch, thereby improving the flexibility of the household energy storage system.

Figure 6:
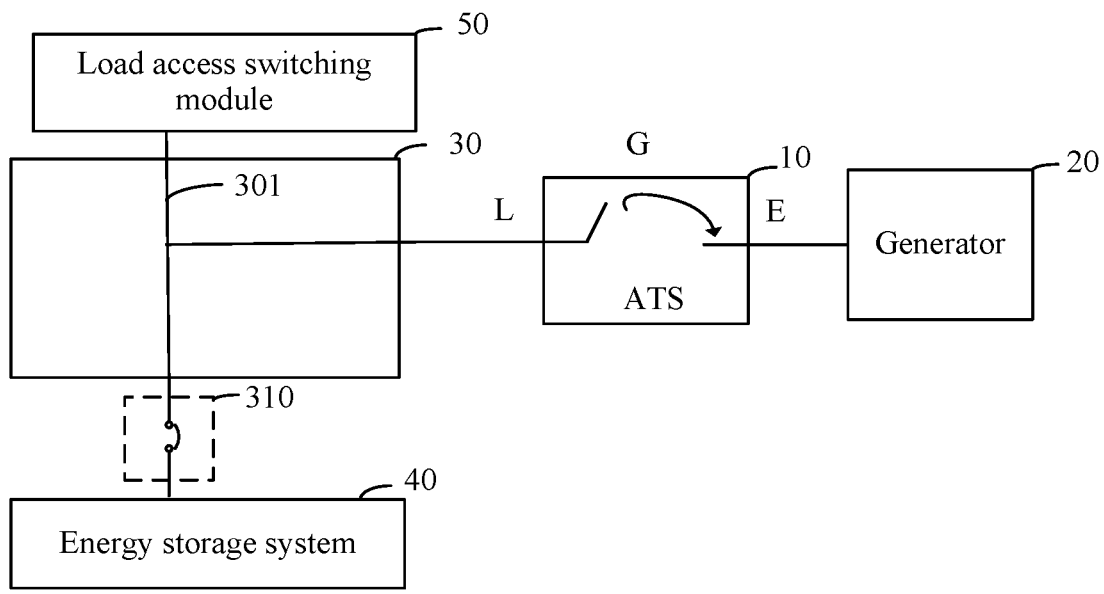
FIG. 6 is another structural diagram of an energy gateway in an embodiment of the present application.

As shown in FIG. 6, the energy gateway 30 further includes a fourth circuit breaker 310, where a first terminal of the fourth circuit breaker 310 is coupled to the bus, and a second terminal of the fourth circuit breaker is coupled to the energy storage system 40. Optionally, when the fourth circuit bearer 310 is in a normally-closed state, the coupling of the energy storage system and the energy gateway is achieved.

In this embodiment, the bus is connected to the energy storage system through the fourth circuit breaker, and the energy storage system is controlled to be connected to the bus, so as to store energy for the household energy storage system.

Figure 7:
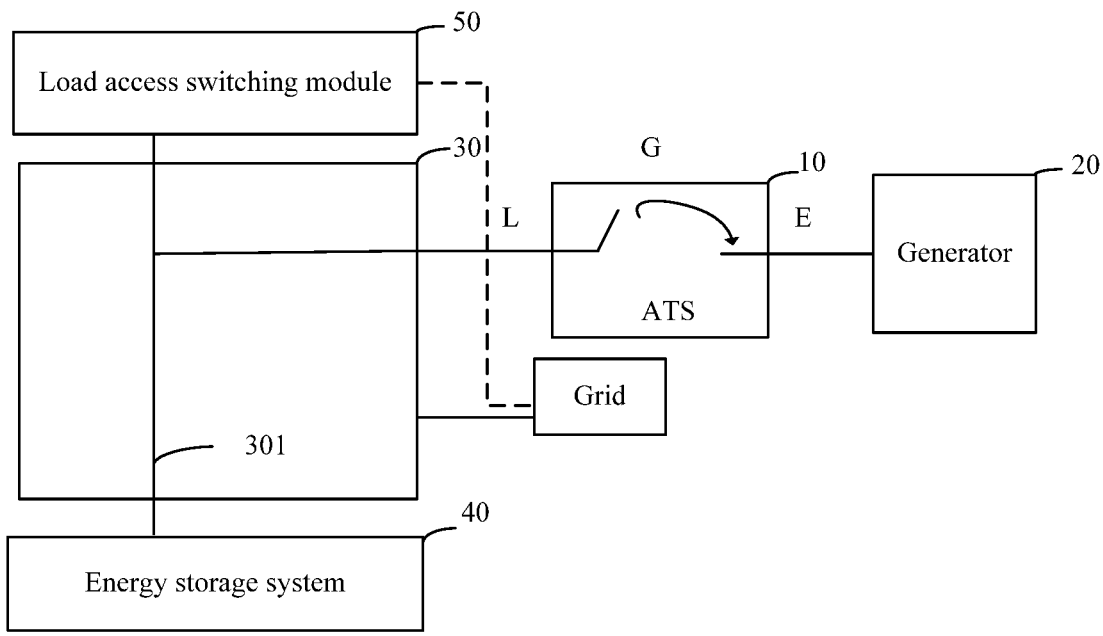
FIG. 7 is another structural diagram of an energy gateway in an embodiment of the present application.

As shown in FIG. 7, the load access switching module 50 is coupled to the bus or coupled to the grid.

The load in the load access switching module 50 may be adjusted according to actual conditions.

In this embodiment, the load access switching module is coupled to the bus or coupled to the grid so that the load is connected to the household energy storage system and the flexibility of the household energy storage system is improved.

Figure 8:
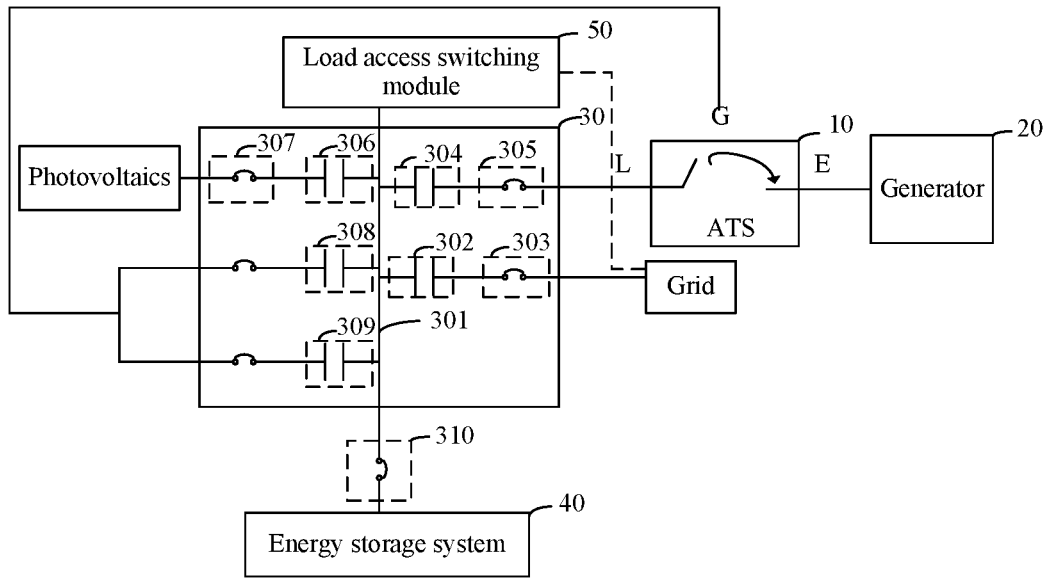
FIG. 8 is another structural diagram of an energy gateway in an embodiment of the present application.

As shown in FIG. 8, FIG. 8 includes the composition of FIGS. 2 to 7. Through the composition shown in FIG. 8, the generator and the household energy storage system can be linked, thereby improving the flexibility of the household energy storage system.

For the convenience and simplicity of the description, the division of multiple preceding functional units and modules is used as an example. In practice, the preceding functions may be assigned to different functional units and modules as needed, that is, the internal structure of the device is divided into different functional units or modules so as to implement all or part of the functions described above.

What is claimed is:

1. A generator access system for household energy storage, comprising:
    an automatic transfer switch (ATS);
    an energy gateway;
    an energy storage system; and
    a load access switching module,
    wherein:
    the energy gateway is connected to the automatic transfer switch (ATS) and the automatic transfer switch (ATS) is further connected to a generator;
    the automatic transfer switch (ATS) is configured to control coupling of the energy gateway and the generator and decoupling of the generator from the energy gateway;
    the energy storage system is connected to the energy gateway and comprises at least one energy storage module configured to store electrical energy; and
    the load access switching module is connected to the energy gateway and configured to control a number of connected loads.

2. The system of claim 1, wherein the energy gateway comprises:
    a bus and a switch coupled to the bus,
    wherein the switch is configured to control:
        a coupling of the energy gateway with a grid and
        a decoupling of the grid from the energy gateway.

3. The system of claim 2, wherein the energy gateway further comprises:
    a circuit breaker, wherein
    a first terminal of the circuit breaker is connected to the switch, and
    a second terminal of the circuit breaker is connected to the grid.

4. The system of claim 1, wherein the energy gateway comprises:
    a bus and a switch coupled to the bus,
    wherein the switch is configured to control:
        a coupling of the energy gateway with the generator and
        a decoupling of the generator from the energy gateway.

5. The system of claim 4, wherein the energy gateway further comprises:
    a circuit breaker, wherein
    a first terminal of the circuit breaker is connected to the switch, and
    a second terminal of the circuit breaker is connected to an L terminal of the automatic transfer switch (ATS).

6. The system of claim 1, wherein the energy gateway comprises:
   a bus and a switch coupled to the bus,
   wherein the switch is configured to control:
   a coupling of the energy gateway with photovoltaics and
   a decoupling of the photovoltaics from the energy gateway.

7. The system of claim 6, wherein the energy gateway further comprises:
   a circuit breaker, wherein
   a first terminal of the circuit breaker is connected to the switch, and
   a second terminal of the circuit breaker is connected to the photovoltaics.

8. The system of claim 1, wherein the energy gateway comprises:
   a bus, a first switch and a second switch, wherein
   a first terminal of the first switch and a first terminal of the second switch are coupled to the bus, and
   a second terminal of the first switch and a second terminal of the second switch are coupled to a G terminal of the automatic transfer switch (ATS).

9. The system of claim 1, wherein the energy gateway further comprises:
   a circuit breaker, wherein a first terminal of the circuit breaker is coupled to the bus, and
   a second terminal of the circuit breaker is coupled to the energy storage system.

10. The system of claim 2, wherein the load access switching module is coupled to the bus or coupled to the grid.

* * * * *